Oct. 25, 1932.  C. G. HAWLEY  1,883,909
MARINE ENGINE
Filed Dec. 10, 1927    2 Sheets-Sheet 1

Inventor

Charles G. Hawley.

By _____ Attorney

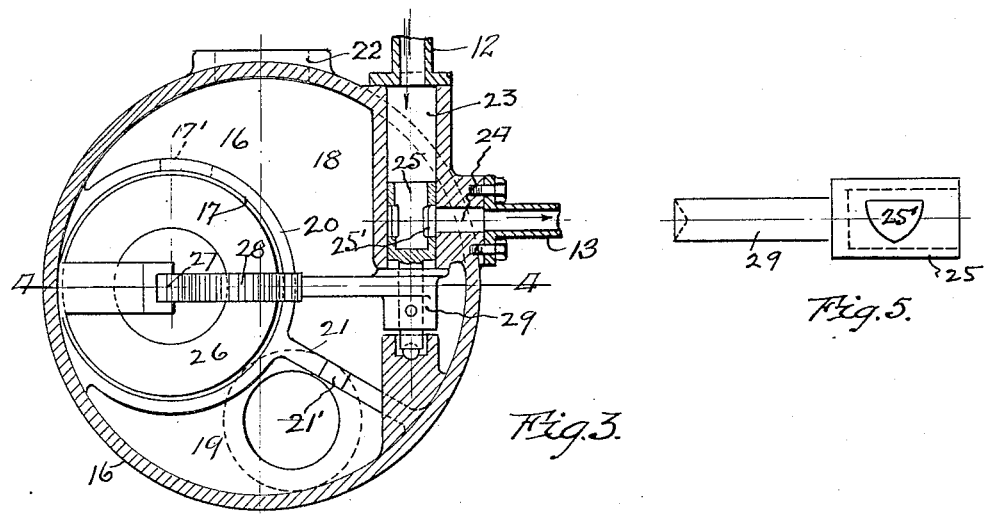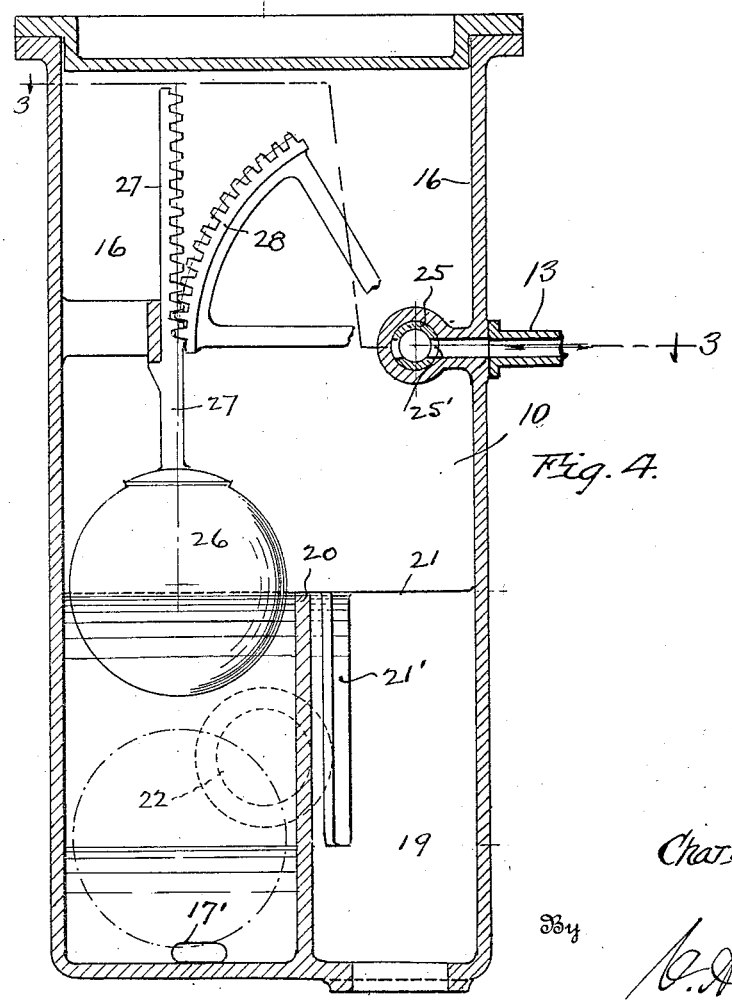

Patented Oct. 25, 1932

1,883,909

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

MARINE ENGINE

Application filed December 10, 1927. Serial No. 239,182.

This invention relates to improvements in the construction and operation of multiple expansion steam engines, with special reference to the improvement of triple expansion marine engines.

The object of the invention is to avoid the heat losses and operating difficulties that are commonly incident to the condensation of the steam within the successive cylinders of such engines.

As a first step toward that end this invention makes provision for removing the water of condensation as rapidly as it is discharged with the steam from the high pressure and intermediate cylinders of the engine; thereby obviating the losses and interferences which result from the common entry of water into respective lower pressure cylinders.

As a next and preferably attendant step toword obtaining and maintaining the theoretically expected power from the engine the invention provides for compensating supplies of live steam to respective lower pressure cylinders; to the end that the heat of the abstracted water should be replaced in the cycles.

Both the abstraction of the condensate and the entry of live steam must occur in the brief time which elapses between the opening and closing of the exhaust and admission valves of succeeding cylinders; and, while the problem is to be expressed in heat units (not in pounds of water and steam) the real medium of measurement is this time fixed by the valve operations.

The separated water may be in larger or smaller quantity as controlled by working conditions. It is finally discharged through a drain weir or gravity orifice the capacity of which, obviously, varies with the column height or head of the discharged water. In turn the entry of live steam to the succeeding cylinder is controlled by a valve which is opened when the discharge of water begins, and which is opened to an extent determined by the volume of the discharged water; and, in varying capacity remains open until the water is completely discharged. Clearly the complete emptying of the water must occur before the next opening of the respective exhaust valve; otherwise the system would fill with water and become useless. These, and other features of the invention are fully described hereinafter and will be readily understood on reference to the drawings which form part of this specification. In said drawings:—

Fig. 3 is a horizontal section substantially on the line 3—3 of Fig. 4, and illustrating the automatic heat exchanger or compensating device which measures the quantity of water removed while the steam is passing from one cylinder to the next and admits to the latter a compensating quantity of live steam, to replace the heat of the abstracted water;

Fig. 4 is a vertical section on the line 4—4 of Fig. 3;

Fig. 5 is an enlarged detail of the live steam controlling valve; and

Figure 1:
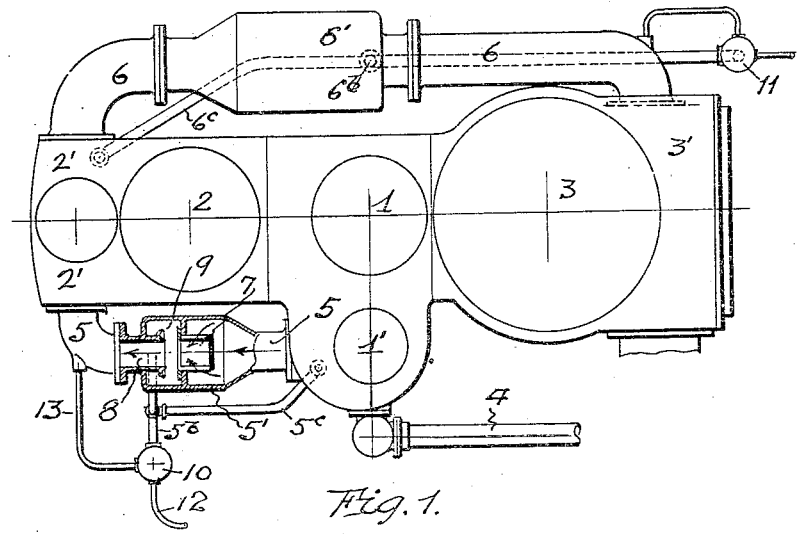
Fig. 1 is a plan view of a triple expansion steam engine embodying this invention.
Figure 2:
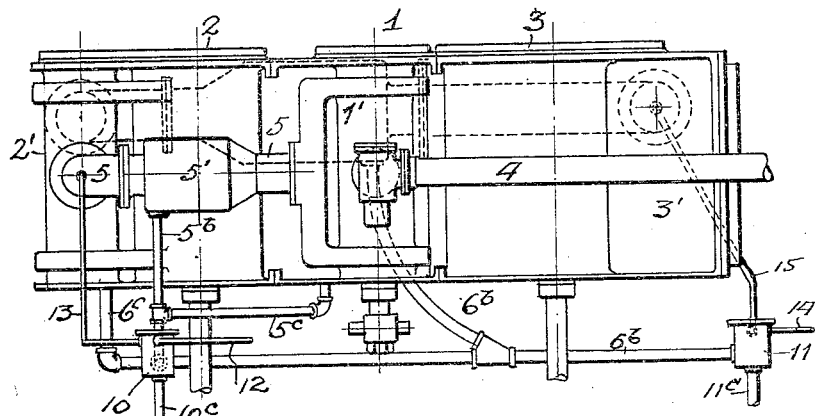
Fig. 2 is a side elevation of the cylinders, valves, etc., composing the upper part of the engine.

The high pressure, intermediate and low pressure engine cylinders are numbered 1, 2 and 3 in Fig. 1. The high pressure valve is located at 1', the intermediate pressure valve at 2' and the low pressure valve at 3'. According to usual practice, the high pressure steam enters from the main 4 and having done its work in the high pressure cylinder passes to the admission valve in the intermediate cylinder through a so-called receiver 5, here of novel form. As said receiver accommodates steam of lower pressure but of substantially the initial weight, the receiver 5 is of larger diameter and capacity than the pipe 4 and the admission ports of the high pressure cylinder. Upon leaving the intermediate cylinder, the still further expanded steam flows to the low pressure cylinder through the medium of the longer and still larger connection or receiver 6, also of a novel form.

The receivers 5 and 6 are rendered novel by the inclusion therein of water separators marked 5' and 6' respectively. These separators serve to remove the moisture from the steam and water mixtures, leaving the steam substantially dry and of uniform temperature for use in succeeding cylinders of the engine.

To be of use in this relation a separator must be adapted to operate with the least possible pressure drop, that is it must oppose the least possible obstruction to the quick flow of the stream. Obviously the separators are used at frequent but very short intervals, first receiving the steam from the higher pressure cylinder and then feeding it to the next lower pressure cylinder; and the time allowed for the separation of the condensate is extremely short. For these reasons I have selected for use, line separators of types which are free from return flow bends and are characterized by the movement of the steam always in a single direction, that is from inlet to outlet.

Such separators comprise typical casings, which are enlarged parts of the respective receivers 5 and 6. In the admission end of each casing is a whirl-promoting element, here represented by part 7 in Fig. 1. At the other end of the casing which contains the separator outlet 8, is a separating race or annular cavity 9, in which the separated moisture is received. The whirling motion imparted to the steam by its passage through the tangential tuyère or element 7, whatever its kind, results in centrifugally separating the moisture just in advance of the separator outlet, allowing only dry steam to pass to the next cylinder, while the water is discharged through a hole at the periphery of the race 9.

As indicated by their corresponding shapes and notwithstanding their different sizes, the receivers 5 and 6 are of the same construction and both operate in the manner described.

The separated moisture leaves the separator 5 through a drain $5^b$ and leaves the separator 6 through a drain $6^b$. The parts 10 and 11 to which these pipes are respectively connected may be common automatic steam traps. But preferably those parts 10 and 11 comprise measuring devices or compensators of the construction detailed in Figs. 3 and 4. Before referring to those details attention is called to the pipe connections $5^c$ and $6^c$ whereby the water accumulating at the bottoms of the valves 1' and 2' may be discharged into respective traps or compensators 10 and 11 along with the water from the separators.

The shell 16 forms the compensator 10 as indicated in detail in Figures 3 and 4.

Attention is now directed to the small pipe 12 which leads into the compensator 10; and to the small pipe 13 which leads from the compensator into the delivery end of the receiver 5; that is, just ahead of the valve 2'. These connections 12 and 13 supply the compensating quantities of live steam at the intake of the intermediate cylinder. Similarly the pipes 14 and 15, through the medium of the compensator 11, supply steam to the delivery end of the receiver 6.

This compensating supply of steam is based upon the ascertaining initial pressure and temperature of the steam taken from the associated boiler and upon the known quantity and temperature of the condensate from each cylinder as determined by tests or by mere calculation of the work done in each cylinder. The compensating quantity is not measured in pounds but strictly in heat units, it being obvious that the heat abstracted by the removal of the water is the only fair measure of the heat that should be contained in the replenishing supplies of steam. Excessive replenishing supplies may be depended upon to re-evaporate the water of condensation, but obviously such re-evaporation would require an expenditure of energy extraneous to the direct problem of best using the total heat derived from the boiler. Nevertheless re-evaporation may be provided for with a view to the protection of the engine in a mechanical sense.

As stated, the invention does not require the delivery of compensating quantities of live steam to the engine cylinders but may end with the certain discharge of water from the receivers. If employed, the quantity of live steam may best be measured and dealt with through the medium of compensating pots or traps of the construction exemplified in Figs. 3 and 4. That device comprises a closed pot or chamber 16 which has two water wells 17 and 18 and one drain well 19, all in its lower part. These wells are separated by the vertical walls 20 and 21. The wells 17 and 18 are cross-connected by a small port 17', while the wells 18 and 19 communicate through a vertical weir 21'. The water from the separator enters through the pipe connection 22, for the pipe $5^b$, which is below the tops of the walls 20 and 21, and according to the suddenness and quantity of such entrance of water, the wells 18 and 17 will be filled to given levels, and in some cases to a level which suddenly overflows the wall 21. The water thus received is promptly evacuated through the weir 21' and drains into the discharge well 19, from which it is discharged through a pipe which, following ordinary practice, may lead to an ultimate trap or connection with a feed water heater or lead direct to pump and boiler. $10^c$ represents such return drain leading from the bottom hole of the compensator 10; and the pipe $11^c$ is the corresponding drain of the compensator 11. Obviously the well 17, because of the connecting port 17', is initially filled with water to the level attained by the water in the well 18. It empties perhaps more slowly due to the relative smallness of the by-pass 17'. As will be apparent, the level in the well 17 changes constantly from low level to high level and back to low level during each admission of steam to the receiver. The live steam connection (12 or 14) enters the compensator at 23 and passes out at 24. It encounters the rocker valve 25, which valve is opened and closed in response to the changes of water level in the well 17. Any suitable mechanism may be employed for the purpose, but preferably comprises the float 26, the vertical rack 27, the gear segment 28, and a connection 29 by which it is joined to the rocker valve.

Preferably the port 25' of the valve 25 partakes of the form shown in Fig. 5, so that the flow of steam to the engine shall be proportioned to the flow of water from the weir 21'. The higher the level attained in the well 18 the more rapid will be the discharge of hot water to the weir, and by shaping the steam valve substantially as here shown the volume of steam delivered to the engine may be made to correspond quite exactly.

Having thus described my invention, I claim as new and desire to secure by Letters Patent:—

1. A multiple expansion steam engine including the receiver which extends from the exhaust cavity of the higher pressure engine to the admission cavity of the lower pressure engine, in combination with a condensate separator interposed in said receiver, means measuring the condensate discharged by said separator, and, interrelated means controlled thereby and measuring a replenishing supply of live steam to said admission cavity.

2. A multiple expansion steam engine including a receiver which extends from the exhaust cavity of the higher pressure engine to the admission cavity of the lower pressure engine, in combination with a condensate separator interposed in said receiver, valve means permitting and controlling the escape of the condensate intercepted by said separator and means associated with said valve means adapted for actuation by the passing condensate and measuring and introducing a heat compensating supply of higher pressure steam to said admission cavity of the lower pressure engine.

3. The herein described heat compensator adapted to receive the water of condensation from a higher pressure steam engine and to supply a succeeding lower pressure steam engine a compensating measure of live steam, said compensator consisting of a closed chamber having a condensate admission opening and a well in its lower part, the latter having a condensate drain weir, in combination with a valved live steam pipe, a control valve therein provided with a stem which is positioned within said chamber, a float set in said well, and an operating connection between said float and valve stem; whereby the steam valve is opened and closed in proportion to the quantity of condensate discharged through said weir and during the period of such discharge.

4. The herein described heat compensator adapted to receive the water of condensation from a higher pressure engine and to supply to a succeeding lower pressure steam engine a compensating measure of live steam, said compensator consisting of a closed chamber having a condensate admission opening and a well in its lower part, the latter having a condensate drain weir in combination with a valved live steam pipe, a control valve therein having a modified outlet nozzle and provided with a stem which is positioned within said chamber, a float set in said well, and an operating connection between said float and valve stem, whereby the steam valve is opened and closed in proportion to the quantity of condensate discharged through said weir and during the period of discharge.

In testimony whereof, I have hereunto set my hand this 8th day of December A. D. 1927.

CHARLES GILBERT HAWLEY.